United States Patent
McFarland et al.

[15] 3,651,996
[45] Mar. 28, 1972

[54] APPARATUS FOR PRESSURIZING A FLUID SYSTEM

[72] Inventors: Frederick R. McFarland; Walter L. Diffenderfer, both of Lancaster, Pa.

[73] Assignee: K-D Manufacturing Company, Lancaster, Pa.

[22] Filed: Apr. 29, 1970

[21] Appl. No.: 32,865

[52] U.S. Cl. ............................................. 222/385, 417/437
[51] Int. Cl. ........................................ B67d 5/42, B67d 5/50
[58] Field of Search .................................... 222/385; 417/437

[56] References Cited

UNITED STATES PATENTS

| | | | |
|---|---|---|---|
| 1,495,505 | 5/1924 | Beaman | 417/437 |
| 1,676,358 | 7/1928 | Schott | 222/385 X |
| 1,170,726 | 2/1916 | Aycock | 222/385 X |
| 1,814,504 | 7/1931 | Collins | 222/385 X |
| 1,699,293 | 1/1929 | Holtson | 222/385 X |
| 976,825 | 11/1910 | Nemecek | 222/385 X |

Primary Examiner—Carlton R. Croyle
Assistant Examiner—Richard J. Sher
Attorney—Paul and Paul

[57] ABSTRACT

An apparatus is provided for pressurizing a fluid system, for example, a hydraulic brake system of an automobile, which is comprised of a tank for holding a supply of fluid and a pump. The pump is connected to the tank through a pressure sensitive check valve. The pump has a piston which, when it is drawn upward, creates a vacuum inside the pump which causes the check valve to open and allows fluid from the tank to flow into the pump. When sufficient fluid is inside the pump, pressure is then applied to the piston which pressurizes the fluid inside the pump and closes the check valve. The fluid inside the pump is now under pressure and in this condition can be introduced into various fluid systems for the purpose of pressurizing the systems. This apparatus is especially useful for bleeding of hydraulic brake systems.

9 Claims, 2 Drawing Figures

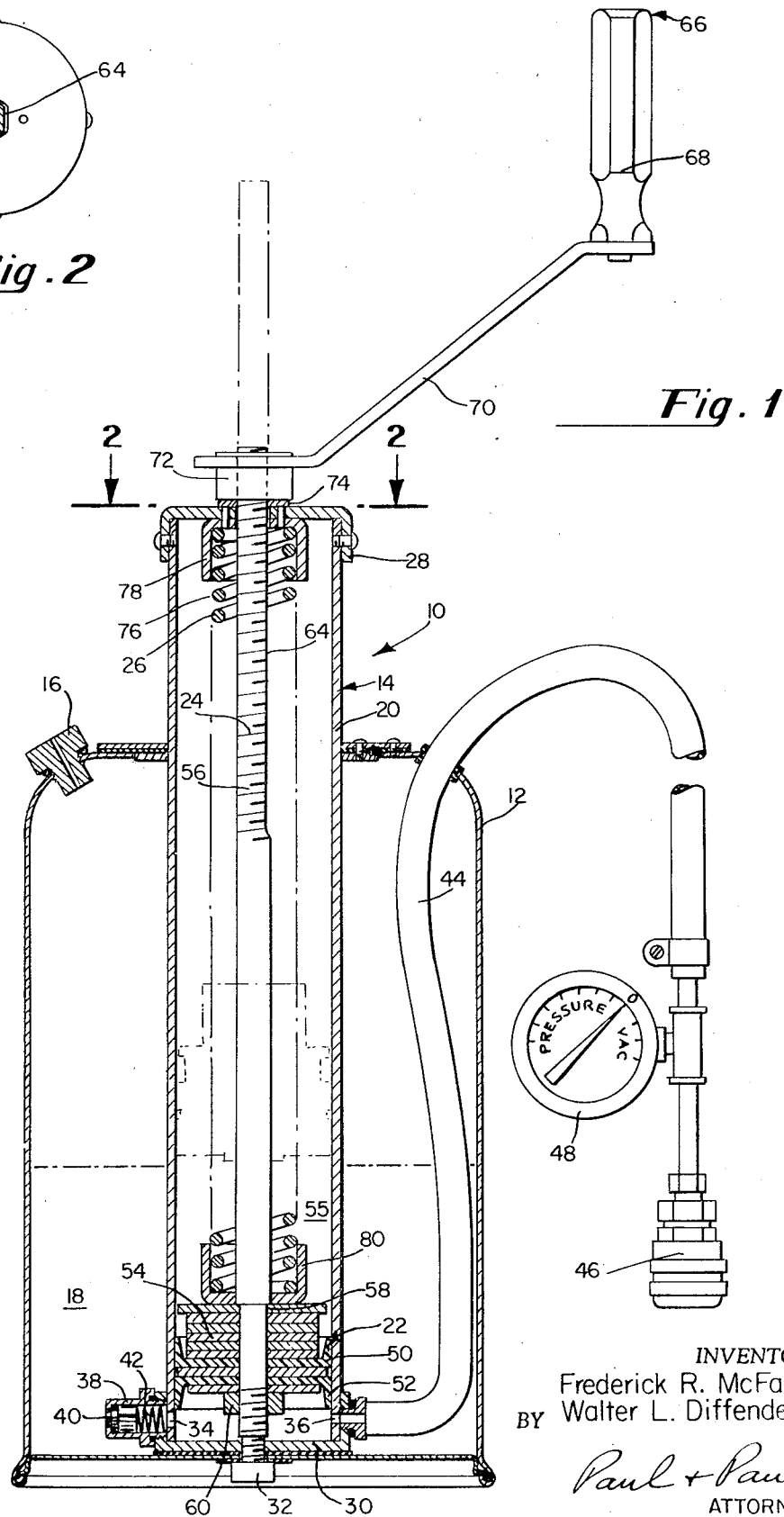

APPARATUS FOR PRESSURIZING A FLUID SYSTEM

BACKGROUND OF THE INVENTION

1. Field of the Invention

This invention relates to apparatus for pressurizing fluid systems. More particularly, this invention relates to an apparatus for bleeding hydraulic brake systems.

2. Description of the Prior Art

In modern hydraulic brake systems of the type normally used on automobiles, it is essential that the brake systems be completely free of entrapped air. Whenever, the hydraulic brake fluid is changed or the hydraulic brake system is opened up, as for example, when a wheel cylinder is replaced it is necessary to bleed the entire system. In order to bleed hydraulic brake systems, the hydraulic fluid in the system is put under pressure and bleeder ports on the wheel cylinders are opened. The brake fluid is allowed to flow from each of these ports until the fluid is free of air. In order to pressurize the brake system, various methods are used. One method is to have one person apply the brakes while the second person simultaneously bleeds fluid from each of the ports. This method has many disadvantages. It requires two persons to bleed brakes. This, of course, substantially increases the labor cost involved. Furthermore, the bleeding of the brakes must be periodically interrupted in order to add additional fluid to the master cylinder to replace the air and fluid removed from the bleeder ports.

Various types of apparatus have been suggested to assist in bleeding of brakes. The most widely known type of apparatus employed is what is generally known in the art as a bleeder tank. In the prior art bleeder tanks, compressed air was utilized to pressurize the brake fluid in the brake systems. The prior art apparatus permitted one man to easily bleed brakes, but had certain inherent disadvantages. Compressed air, especially the compressed air available in most garages, inherently contains relatively large amounts of water, dirt and other contaminants. When the compressed air is used to pressurize the fluids, the water and other contaminants enter the brake fluid. The contaminants have a rather severe adverse effect on the properties of the brake fluid and also the cause the ferrous metal parts of the brake system to rust. The problem of contamination is especially critical with brake fluids used in brake systems having disc brakes since these fluids operate at much higher temperatures and are more sensitive to contamination.

A further problem with the compressed air operated bleeder tanks is that if the tanks are over pressurized, or if they are weakened because of structural defects, or deterioration due to for example, rusting of the tank, the tank can explode and cause considerable damage.

A further problem of the compressed air bleeder tanks is that the apparatus must be used in facilities having compressed air readily available. This, of course, makes this type of apparatus completely unsuitable for the do-it-yourself home mechanic.

It is accordingly an object of this invention to overcome the aforementioned problems and disadvantages of the prior art.

If is a further object of this invention to provide an apparatus for pressurizing fluid systems which does not require the use of compressed air.

It is a more specific object of this invention to provide a self-contained, safe apparatus which can be used by one man to successfully bleed hydraulic brake systems.

Other objects and advantages of this invention will become further apparent hereinafter and from a reading from the subjoined claims.

SUMMARY OF THE INVENTION

The objects of this invention have been achieved by providing an apparatus having a reservoir for fluid and a pump. The pump has a piston which, when slid in one direction, creates a vacuum which draws fluid from the reservoir into a chamber in the pump. The piston is connected to a mechanical means which then is utilized to force the piston in the opposite direction which applies pressure to the fluid in the chamber.

BRIEF DESCRIPTION OF THE DRAWINGS

FIG. 1 is a cross-sectional illustration of the preferred embodiment of this invention.

FIG. 2 is a top plan view in partial cross section taken as indicated by the lines and arrows 2—2 of FIG. 1.

DESCRIPTION OF THE PREFERRED EMBODIMENTS

The apparatus of this invention 10 is comprised of a tank 12 and a pump 14. The tank 12 is a closed cylindrical tank having a fill plug 16 at the upper end thereof. The fill plug 16 has a vent hole in it which is in communication with the atmosphere and the interior of the tank so that the pressure on the fluid 18 in the tank is maintained at ambient pressures. The volume of the tank is selected so as to hold a unit volume of fluid, for example, a gallon of fluid. The tank is preferably constructed from a corrosion resistant material such as a plated steel, stainless steel or a reenforced plastic, such as glass reenforced epoxy resin.

The pump 14 is positioned concentrically within the tank 12. The pump 14 is comprised of an elongated cylindrical tube 20, a piston 22, a retracting means 24 for drawing the piston 22 in an upward direction and a return means 26 for urging the piston in a downward direction.

The cylindrical tube 20 has an end cap 28 secured to the upper end thereof. The lower end of the cylindrical tube 20 is sealed with an end plate 30. A drain plug 32 extends through the bottom of the tank 12 and the end plate 30. This drain plug 32 can be removed for the purposes of draining any fluid from inside the pump 14. The drain plug 32 also acts as a stop means with respect to the downward movement of the piston 22. The cylindrical tube 20 has an inlet port 34 and an outlet port 36 immediately adjacent the end plate 30. The inlet port 34 is in communication with a pressure sensitive valve 38. The sealing member 40 of the check valve 38 is biased toward the tank 12 by the spring 42. The valve 38 is adapted to open when the pressure on the fluid 18 in the tank 12 is greater than the pressure inside the pump 14 immediately adjacent the inlet port 34.

The outlet port 36 is connected to a pressure resistant hose 44 which terminates in a quick disconnect coupling 46 which is of standard design and includes the usual spring operated valve. At a point intermediate between the outlet port 36 and the quick disconnect coupling 46, there is a gauge 48 which measures both pressure and vacuum.

The piston 20 is comprised of an upper cup 50 and a lower cup 52 and a plurality of reinforcing washers 54. The upper and lower piston cups 50, 52 are slidably engaged with the walls of the cylindrical tube 20 in a gas tight - liquid tight fit. The cups 50, 52 can be made of various materials, for example, rubber and even more preferably, polytetrafluoroethylene. The fit between the walls of the cylindrical tube 20 and the position is such that when the piston is drawn in an upper direction, a vacuum is created in the chamber 55 formed in the lower portion of the cylindrical tube 20.

The piston 22 is connected to a rod 56 which extends the whole length of the cylindrical tube 20. At the lower end of the rod, the diameter of the rod is reduced to provide a shoulder 58 against which the upper most washer of the piston 22 is held. The lower terminal end of the rod 56 is threaded and a nut 60 is provided which secures the piston to the lower terminal end of the rod 56.

The upper end portion of the rod 56 has an elongated threaded portion having a flat 64 on one side. The elongated threaded portion is threadably engaged with a handle assembly 66. The handle assembly is an integral unit which consists of a grip 68, a lever 70 and a threaded nut 72. The handle rests on the bearing 74 on the end cap 28.

A compression spring 76 surrounds the rod 56 and is held in place by the retainers 78, 80 attached to the lower side of the end cap 28 and the upper side of the piston 22.

In operation, the tank 12 is filled with a fluid 18, for example, hydraulic brake fluid by removing the fill plug 16 and inserting the fluid through the fill hole into the tank.

The piston 22 is shown in the starting position in solid line in FIG. 1. The lower most position of the piston 22 is limited by the rod 56 which contacts the drain plug 32. Even in the lowest position, the inlet and outlet ports 34, 36 are not sealed by the piston cups 52, 54.

The piston 22 is drawn upward through the cylindrical tube 20 by the retracting means 24. The handle assembly 66 is rotated which causes the nut 72 which is threadably engaged with the rod 56 to rotate about the rod 56. Because of the flat 64 on the rod 56, which is in contact with a mating hole in the end cap, the rod does not rotate with the nut 72, but moves in an upward direction as is indicated in phantom on FIG. 1. As the retracting means 24 is drawn upward, it draws with it the piston 22. The cups 50, 52 are engaged in a gas tight fit with the walls of the cylindrical tube and accordingly, a vacuum is created in the lower end of the tube. Because of this vacuum, the check valve 38 then opens and the fluid 18 from the tank 12 flows into the chamber 54 formed at the lower end of the cylindrical tube when the piston is drawn back to the position shown in phantom.

The compression spring 76 is put into a compressed state when a retracting means 24 is drawn upward. The handle 66 is now turned in the opposite direction and pressure is applied to the fluid in the chamber which causes the check valve 38 to again close. The fluid 18 in the chamber 54 then flows out the outlet port 36 through the hose 44, pass the pressure gauge 48 and is then stopped by the valve in the quick disconnect coupling 46. The amount of fluid dispensed can be controlled and adjusted by the amount the retracting means 24 is allowed to descend into the chamber. By selectively only returning the retracting means part of the way, such that the pressure is applied to the fluid 20 in the chamber 54, the relative amount of pressurized fluid dispensed can be somewhat limited engagement of the nut 72 against the bearing 74. Furthermore, by doing this it is possible to remove portions of the fluid from the chamber and then again raise the pressure by further lowering the retracting means so that a relatively constant amount of pressure can be maintained on the liquid in the pump.

In order to use the apparatus of this invention for pressurizing a given fluid system, the pressurized fluid in the chamber is put in communication with the system. The exact method of connecting the apparatus of this invention to the fluid system, varies depending upon the particular configuration of the given fluid system. Typically in automobile brake systems, a male adapter is provided which is applied to the master cylinder. The female quick disconnect coupling 46 is then forced over the male adapter and the valve in the coupling 46 is opened allowing the pressurized fluid in the apparatus 10 to flow into the brake system. The brakes are then bled in the conventional manner as noted above.

There are many advantages to the apparatus 10 of this invention. The apparatus is a closed system so that contaminates do not enter the fluid. Furthermore, the fluids are drawn through the apparatus by vacuum and mechanically pressurized which further eliminates the possibility of contamination. The apparatus of this invention 10 is a self-contained unit which does not require additional equipment such as compressors and the like for operation. Using the apparatus of this invention, one man can easily bleed a brake system. Furthermore, since the apparatus is essentially a closed apparatus, extra fluid can be stored in the apparatus over a somewhat extended period of time without the danger of having the fluid become contaminated.

It should be appreciated that the form of the invention herewith shown and described is the preferred embodiment of this invention. Various changes can be made in the size, shape and arrangement of the various parts of the apparatus. In addition equivalent elements can be substituted for those illustrated and described herein all without departing from the spirit or scope of the invention as defined in the subjoined claims. For example, it is possible to have the pump and the tank in a juxtapose relationship as opposed to the concentric relationship shown in the drawings. It should be appreciated, however, that the concentric arrangement is the preferred embodiment, in that this embodiment affords considerable protection to the delicate parts of the pump such as the check valves, cylindrical wall, outlet ports and inlet ports which is not afforded when the pump is in an exposed position such as when the tank and the pump are in a juxtapose relationship. The tank, as illustrated, in FIG. 1 is a closed tank and this is the preferred embodiment since it affords maximum protection from contamination to the fluid in the tank. However, it should be appreciated that this tank could also open top tank and that this embodiment may have some advantages wherein the fluid will be rapidly used and will not be exposed to any considerable danger of contamination. Even with regard to the closed tank, there are of course certain improvements which could readily be incorporated in the tank without departing from the spirit or scope of this invention. For example, the fill plug of this tank shown could also include filter means in the vent hole to further eliminate the possibility of contamination of the fluid in the tank. In addition, a cap means could be provided for the vent to prevent escape of the fluid from the tank during extended storage.

There are, of course, many variations of apparatus which could be employed in place of the screw feed illustrated in FIG. 1. The screw retracting means shown, could be replaced with a rack and pinion operated by a similar lever mechanism or even more simply, by a rachet assembly. In addition, a cable and winch like arrangement could be employed for the purpose of retracting the piston. The compression spring shown in FIG. 1, greatly facilitates the use of this apparatus but it could likewise be eliminated and the retracting means adapted so as to be capable of both applying the force to pull up the piston and then applying the force to force it downward to pressurize the fluid. The rack and pinion arrangement noted above, is especially suitable for this type of embodiment.

The gauge, which is shown, in FIG. 1 is of course an auxiliary piece of equipment which is highly advantageous for use in this embodiment, but which could, if desired, also be eliminated.

The quick disconnect coupling shown in FIG. 1 is a typical type of connector which is widely used in the fluid transfer field. However, the quick disconnect coupling could, of course, be replaced with various other types of valve means. For example, it may be of considerable advantage in certain applications, to replace the quick disconnect valve with a proportioning valve since this will allow the pressure of the fluid coming from the valve to be more closely regulated. The apparatus of this invention has been illustrated with particular reference to its use in bleeding of hydraulic brake systems. It should be fully appreciated that the use of this apparatus is not limited to that particular application. This apparatus can, for example, be used for filling of cooling systems with refrigerants and the like. It should be further appreciated that additional features can be incorporated into the invention. For example, the rod 56 can be marked on the flat portion 64 with indicia which can then be used to quantitatively determine the amount of fluid introduced into a given system, since the length of travel of the rod 56 determines the amount of fluid forced out of the lower chamber 54 into the fluid system.

What is claimed is:

1. An apparatus for increasing the pressure of a fluid comprised of: a fluid reservoir means, a pump means, a check means, and a valve means; said fluid reservoir means having vent means in communication with the atmosphere whereby a fluid held in said fluid reservoir means is maintained at approximately atmospheric pressure; said pump means being comprised of a cylindrical tubular member having a closed lower end, a piston means positioned within and reciprocally slidably engaged with the interior wall of said cylindrical tubular member in a gas type-liquid type fit, first means including a selectively operable handle assembly rotatable in a first direction for drawing said piston in an upward direction thereby reducing the pressure in the zone between the piston and said lower end and rotatable a selected amount in a second direction opposite to said first direction for providing an adjustable preselected limitation upon piston decent, and second means for applying and maintaining a downward force on said piston so as to raise and maintain the pressure of the fluid in said zone; said cylindrical tubular member having an inlet port and an outlet port immediately adjacent the lower end thereof, said inlet port being in communication with said fluid reservoir means through said check means, said check means being pressure sensitive allowing fluids to flow from the fluid reservoir means to said pump means when the pressure within the zone is less than the pressure of the fluid in the reservoir means; said outlet port being in communication with said valve means.

2. The apparatus according to claim 1 wherein said fluid reservoir means is a closed vented tank.

3. The apparatus according to claim 2 wherein said pump means is positioned within said tank.

4. The apparatus according to claim 1 wherein said fluid reservoir is a closed vented cylindrical tank and said pump is positioned concentrically within said tank.

5. The apparatus according to claim 1 wherein said piston has an upward extending and a downward extending piston cup sealing means.

6. The apparatus according to claim 1 wherein said first means is comprised of a connecting rod which is attached at its lower end to said piston and is engaged at its upper end with a said handle assembly.

7. The apparatus according to claim 6 wherein said second means is a helically wound compression spring having its upper terminal end in a fixed position and its lower end in contact with said piston means whereby when said piston is drawn in an upward direction by said first means said second means is energized.

8. The apparatus according to claim 1 having pressure sensing means between the said outlet port and said valve means.

9. The apparatus for pressurizing a fluid comprised of a closed vented tank, a pump, a check valve, and a shut off valve, said pump being comprised of (a) a cylindrical tubular member having a closed lower terminal end and an inlet port and an outlet port immediately adjacent said lower terminal end, (b) a piston having upward and downward extending piston cups positioned for reciprocal movement within said tubular member in a gas tight-liquid tight fit, (c) first means for drawing said piston in an upward direction, and for providing a preselected limitation upon piston descent, comprised of a rod having its lower end attached to said piston and its upper end threadably engaged with a mating handle assembly whereby when said handle assembly is rotated in a first direction, said piston is drawn in an upper direction reducing the pressure within the portion of said cylindrical tubular member between the piston and the lower terminal end and whereby, when said handle assembly is rotated in a second direction opposite to said first direction, a selected amount, the descent of the piston is limited to an increment of distance corresponding to said selected amount, and (d) second means for applying and maintaining pressure on fluid entrapped within said pump comprised of a helically wound compression spring positioned concentrically about said rod having its upper terminal end in a fixed position and its lower terminal end in contact with said piston whereby said second means is energized by the said first means being wound in said first direction and the force of said second means is released by rotating said handle assembly in the second direction, said outlet port being in communication with said tank through said check means, said check means being biased so as to allow fluid to flow from the tank to the pump only when the pressure within the pump is less than the pressure within the tank, said outlet means being in communication with said shut off valve whereby when the shut off valve is closed and the piston is retracting by the first means, the pressure within the pump is reduced and the check valve opens to allow fluid from the tank to flow into the pump, then the fluid is pressurized by releasing the second means.

* * * * *

UNITED STATES PATENT OFFICE
CERTIFICATE OF CORRECTION

Patent No. 3,651,996　　　　　　　　　Dated March 28, 1972

Inventor(s) Frederick R. McFarland; Walter L. Diffenderfer

It is certified that error appears in the above-identified patent and that said Letters Patent are hereby corrected as shown below:

Column 2, line 53 change "position" to --piston--.

Column 3, line 34 insert --by-- between "limited" and "engagement".

Signed and sealed this 15th day of August 1972.

(SEAL)
Attest:

EDWARD M.FLETCHER,JR.　　　　　ROBERT GOTTSCHALK
Attesting Officer　　　　　　　　Commissioner of Patents